US011867200B2

(12) United States Patent
Shih et al.

(10) Patent No.: US 11,867,200 B2
(45) Date of Patent: Jan. 9, 2024

(54) STORABLE FAN

(71) Applicant: AIRMATE ELECTRICAL (SHEN ZHEN) CO., LTD., Shenzhen (CN)

(72) Inventors: Juipin Shih, Shenzhen (CN); Feixiong Li, Shenzhen (CN); Youbing Cheng, Shenzhen (CN); Jianwei Huang, Shenzhen (CN)

(73) Assignee: AIRMATE ELECTRICAL (SHEN ZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/250,999

(22) PCT Filed: Nov. 10, 2020

(86) PCT No.: PCT/CN2020/127654
§ 371 (c)(1),
(2) Date: Apr. 28, 2023

(87) PCT Pub. No.: WO2022/088237
PCT Pub. Date: May 5, 2022

(65) Prior Publication Data
US 2023/0392614 A1    Dec. 7, 2023

(30) Foreign Application Priority Data

Oct. 29, 2020    (CN) .......................... 202022456928.4

(51) Int. Cl.
*F04D 29/64*    (2006.01)
*F04D 29/60*    (2006.01)
(Continued)

(52) U.S. Cl.
CPC ........... *F04D 29/644* (2013.01); *F04D 25/08* (2013.01); *F04D 29/002* (2013.01); *F04D 29/60* (2013.01);
(Continued)

(58) Field of Classification Search
CPC ...... F04D 29/644; F04D 25/08; F04D 29/002; F04D 29/60; F04D 29/64; F04D 29/703;
(Continued)

(56) References Cited

U.S. PATENT DOCUMENTS 6,139,270 A * 10/2000 Liao .................. F04D 25/08
416/247 R
11,378,100 B2 * 7/2022 Hu .................. F04D 25/084
(Continued)

FOREIGN PATENT DOCUMENTS

| CN | 101813112 A | 8/2010 |
| CN | 201723537 U | 1/2011 |

(Continued)

*Primary Examiner* — Eldon T Brockman
*Assistant Examiner* — Andrew J Marien
(74) *Attorney, Agent, or Firm* — Bayramoglu Law Offices LLC

(57) ABSTRACT

A storable fan includes a fan head, a support rod and a base that are connected detachably. A first accommodating groove and a second accommodating groove are formed in the base, and the storable fan has a used state and a stored state. In response to the used state of the storable fan, the fan head, the support rod and the base are connected sequentially. In response to the stored state of the storable fan, the fan head is stored in the first accommodating groove, and the support rod is stored in the second accommodating groove. The fan head, the support rod and the base are connected detachably, for ease of detachment of the storable fan. Both the fan head and the support rod can be stored in the base. The storage process can be accomplished without detaching such fasteners as screws and nuts or by only using few fasteners.

10 Claims, 22 Drawing Sheets

(51) Int. Cl.
*F04D 29/70* (2006.01)
*F16M 11/10* (2006.01)
*F16M 11/20* (2006.01)
*F16M 11/28* (2006.01)
*F04D 29/00* (2006.01)
*F04D 25/08* (2006.01)

(52) U.S. Cl.
CPC .......... *F04D 29/64* (2013.01); *F04D 29/703* (2013.01); *F16M 11/10* (2013.01); *F16M 11/20* (2013.01); *F16M 11/2021* (2013.01); *F16M 11/28* (2013.01); *F05B 2210/12* (2013.01)

(58) Field of Classification Search
CPC .... F16M 11/10; F16M 11/20; F16M 11/2021; F16M 11/28; F05B 2210/12
See application file for complete search history.

(56) References Cited

U.S. PATENT DOCUMENTS

2020/0200190 A1\* 6/2020 Cen .................. F16M 11/28
2020/0240578 A1\* 7/2020 Chen ..................... F21S 6/002

FOREIGN PATENT DOCUMENTS

| CN | 104389820 A | 3/2015 |
| CN | 104514733 A | 4/2015 |
| CN | 207728587 U | 8/2018 |
| CN | 110285085 A | 9/2019 |
| CN | 210509656 U | 5/2020 |
| CN | 210565256 U | 5/2020 |
| CN | 210660666 U | 6/2020 |
| CN | 210949218 U | 7/2020 |
| JP | 3225783 U | 4/2020 |
| KR | 20100124454 A | 11/2010 |

\* cited by examiner

STORABLE FAN

CROSS REFERENCE TO THE RELATED APPLICATIONS

This application is the national phase entry of International Application No. PCT/CN2020/127654, filed on Nov. 10, 2020, which is based upon and claims priority to Chinese Patent Application No. 202022456928.4, filed on Oct. 29, 2020, the entire contents of which are incorporated herein by reference.

TECHNICAL FIELD

The present disclosure relates to the technical field of household electrical appliances, and in particular to a storable fan.

BACKGROUND

As a common household electrical appliance, the electric fan is used frequently. The fan is used mostly in summer, but stored in other seasons. Moreover, the conventional fan is hard to store and takes up a large indoor space for its irregular shape. For the sake of storage, the prior fan is wrapped by a guard and placed in the corner. Alternatively, the fan is detached into many parts to store in a case. A base and a support arm usually cannot be separated from a fan body until many screws, nuts and so on are detached. Thus, the storage process is troublesome and complicated, and the footprint is still large. Therefore, the fan in the prior art cannot satisfy requirements of users.

SUMMARY

An objective of the present disclosure is to provide a fan structure capable of being stored conveniently, to solve technical problems of a troublesome and complicated storage process, and a large footprint of the fan in the prior art.

(I) Technical Solutions

To achieve the above objective, an embodiment of the present disclosure provides a storable fan, including a fan head, a support rod and a base that are connected detachably, where a first accommodating groove and a second accommodating groove are formed in the base, and the storable fan has a used state and a stored state;
  in response to the used state of the storable fan, the fan head, the support rod and the base are connected sequentially; and
  in response to the stored state of the storable fan, the fan head is stored in the first accommodating groove, and the support rod is stored in the second accommodating groove.

Further, according to the storable fan, the fan head includes a guard and a connecting segment rotatably connected to the guard; and a fixing hole is formed in the base;
  in response to the used state of the storable fan, two ends of the support rod are respectively connected to the connecting segment and the fixing hole; and
  in response to the stored state of the storable fan, the connecting segment is fixed in the first accommodating groove.

Further, according to the storable fan, the fixing hole and the first accommodating groove are formed in a same side of the base, and the second accommodating groove is formed in the other opposite side of the base.

Further, according to the storable fan, the support rod is a telescopic rod.

Further, according to the storable fan, the support rod is retracted in the stored state.

Further, according to the storable fan, a first end of the support rod connected to the fan head is provided with a first pressing plate, a first engagement member and a first button are provided on the first pressing plate, and a first engagement portion cooperated with the first engagement member is provided on the fan head; and/or a second end of the support rod connected to the base is provided with a second pressing plate, a second engagement member and a second button are provided on the second pressing plate, and a second engagement portion cooperated with the second engagement member is provided on the base.

Further, according to the storable fan, an end of the first engagement member away from the second end of the support rod is provided with an outward wedge-shaped surface; and/or an end of the second engagement member away from the first end of the support rod is provided with an outward wedge-shaped surface.

Further, according to the storable fan, a first locking piece is provided on the fan head, a second locking piece is provided on the base, and in the stored state, the first locking piece is locked with the second locking piece.

Further, according to the storable fan, the first locking piece is a locking rod, a stationary blocking portion is provided on a surface of the locking rod along the radial direction of the locking rod, the second locking piece is a locking hole formed in the base, a movable blocking portion is provided on an inner wall of the locking hole, and the movable blocking portion is extended into the locking hole under an elastic force.

Further, according to the storable fan, a third locking piece is provided in the first accommodating groove, and in the stored state, the connecting segment is locked with the third locking piece.

Further, according to the storable fan, the support rod includes a first rod and a second rod connected to each other; the first rod is nested in the second rod; a plurality of first grooves are formed in an outer wall of the first rod along the axial direction of the first rod; a control assembly, a limiting hole and a locating pin are provided on the second rod; the locating pin is located in the limiting hole; and the control assembly is configured to limit the locating pin in a locked state of being simultaneously engaged in the first groove and the limiting hole or release the locked state of the locating pin.

Further, according to the storable fan, the second rod includes a first wall and a second wall; the second wall is sleeved with the first rod; the control assembly includes a slider and an elastic piece; the slider is slidably provided between the first wall and the second wall; a side of the slider facing the second wall is provided with a second groove; and when the limiting hole directly faces the first groove, the slider limits the locating pin in the limiting hole and the first groove simultaneously under an elastic force of the elastic piece.

(II) Beneficial Effects

Compared with the prior art, the present disclosure has the following beneficial effects:

According to the storable fan provided by the present disclosure, the fan head, the support rod and the base are connected detachably, for ease of detachment of the storable fan. Both the fan head and the support rod can be stored in the base. The storage process can be accomplished without detaching such fasteners as screws and nuts or by only using few fasteners. The storable fan is stored simply and conveniently, with a small footprint.

BRIEF DESCRIPTION OF THE DRAWINGS

The accompanying drawings constituting a part of the present disclosure are provided for further understanding of the present disclosure to make other features, objectives and advantages of the present disclosure more apparent. The schematic drawings of the present disclosure and description thereof are provided to illustrate the present disclosure and do not constitute an undue limitation to the present disclosure. In the drawings.

In the Figures.

Figure 1:
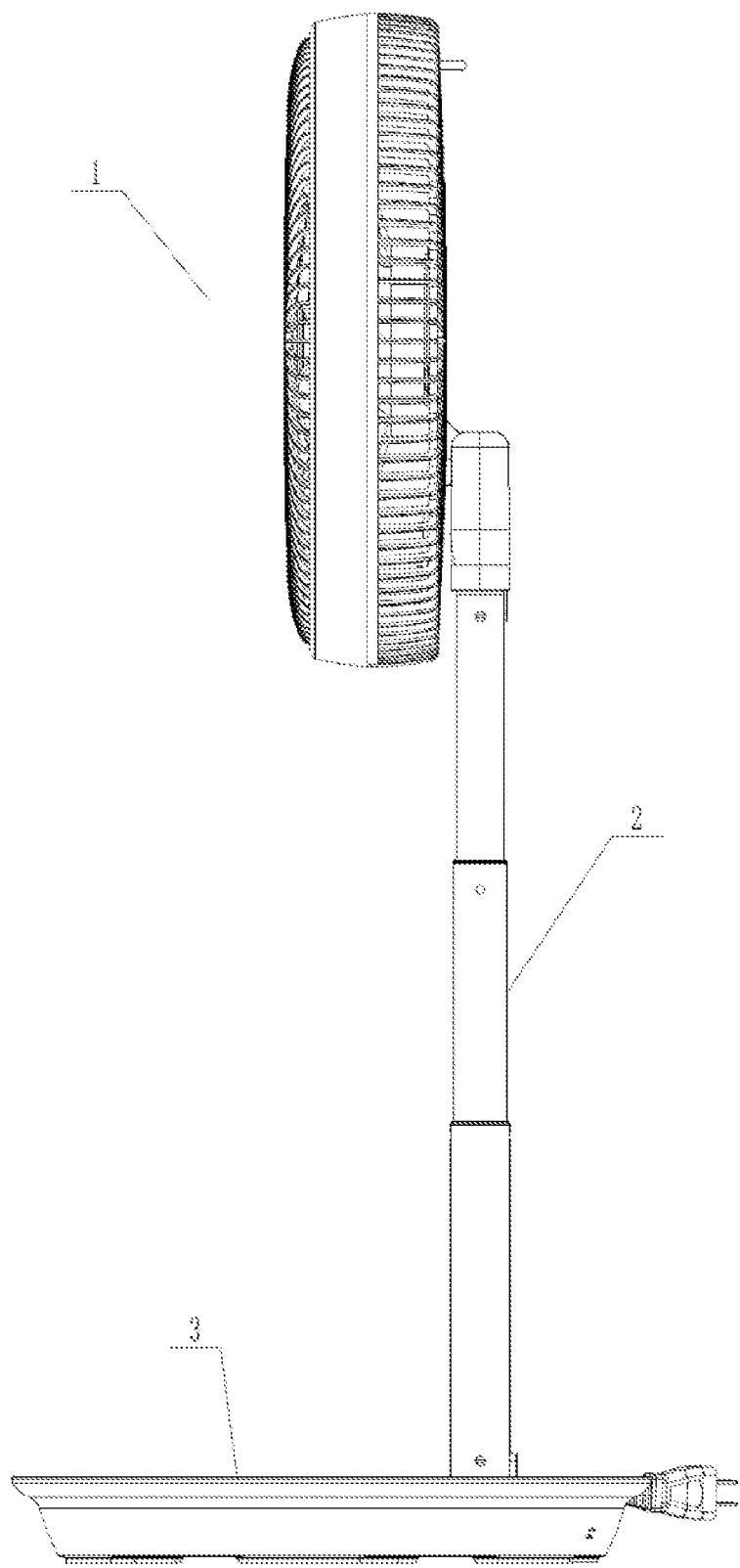
FIG. 1 is a structural reference view of a storable fan in a used state according to an embodiment of the present disclosure.

1: fan head, 101: guard, 102: connecting segment, 103: locking rod, 104: stationary blocking portion, 2: support rod, 201: first pressing plate, 202: first engagement member, 203: first button, 204: second pressing plate, 205: second engagement member, 206: second button, 207: first rod, 208: second rod, 209: first groove, 210: limiting hole, 211: locating pin, 212: first wall, 213: second wall, 214: slider, 215: second groove, 216: third elastic piece, 217: third button, 218: first insertion portion, 219: second insertion portion, 220: fourth elastic piece, 221: fifth elastic piece, 222: locating hole, 223: accommodating groove, 224: propping bead, 225: sixth elastic piece, 226: mounting groove, 3: base, 301: first accommodating groove, 302: second accommodating groove, 303: fixing hole, 304: movable blocking portion, 305: third locking piece, 306: connecting rod, 307: fourth button, 308: first elastic piece, 309: propping member, 310: second elastic piece, and 311: locking hole.

DETAILED DESCRIPTION OF THE EMBODIMENTS

To enable those skilled in the art to better understand the solutions of the present disclosure, the technical solutions in the embodiments of the present disclosure will be clearly and completely described below in conjunction with the accompanying drawings in the embodiments of the present disclosure. Obviously, the described embodiments are only a part of, not all of, the embodiments of the present disclosure. All other embodiments obtained by those of ordinary skill in the art based on the embodiments of the application without creative efforts should fall within the protection scope of the application.

It should be noted that the terms "first", "second", and so on in the description and claims of this application and in the above accompanying drawings are intended to distinguish between similar objects but do not necessarily indicate a specific order or sequence. It should be understood that the data termed in such a way is interchangeable in proper circumstances such that the embodiments of the present disclosure described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those steps or units which are clearly listed, but may include other steps or units which are not expressly listed or inherent to such a process, method, system, product, or device.

In the present disclosure, the terms such as "upper", "inner", "middle", "outer", "front", "rear", and "behind" indicate the orientation or positional relationship shown in the accompanying drawings. These terms are mainly intended to better describe the present disclosure and embodiments thereof, rather than to define that the devices or components indicated must have the specific orientation or be constructed and operated in the specific orientation.

Besides, some of the terms mentioned above may be used to indicate other meanings in addition to indicating the orientation or positional relations. For example, the term "upper" may also be used to indicate an attachment relationship or a connection relationship in some cases. Those of ordinary skill in the art may understand specific meanings of these terms in the present disclosure based on a specific situation.

In addition, the terms "provided with", "connected to" and "fixed to" should be understood in a board sense. For example, "connection" may be a fixed connection, a removable connection, or integration; may be a mechanical connection or an electrical connection; may be a direct connection or an indirect connection implemented by using an intermediate medium; or may be intercommunication between two components, elements or components. Those of ordinary skill in the art may understand specific meanings of the foregoing terms in the present disclosure based on a specific situation.

It should be noted that the examples in the disclosure and features in the examples may be combined with each other in a non-conflicting situation. The present disclosure will be described in detail below with reference to FIGS. 1-21 and embodiments.

Figure 2:
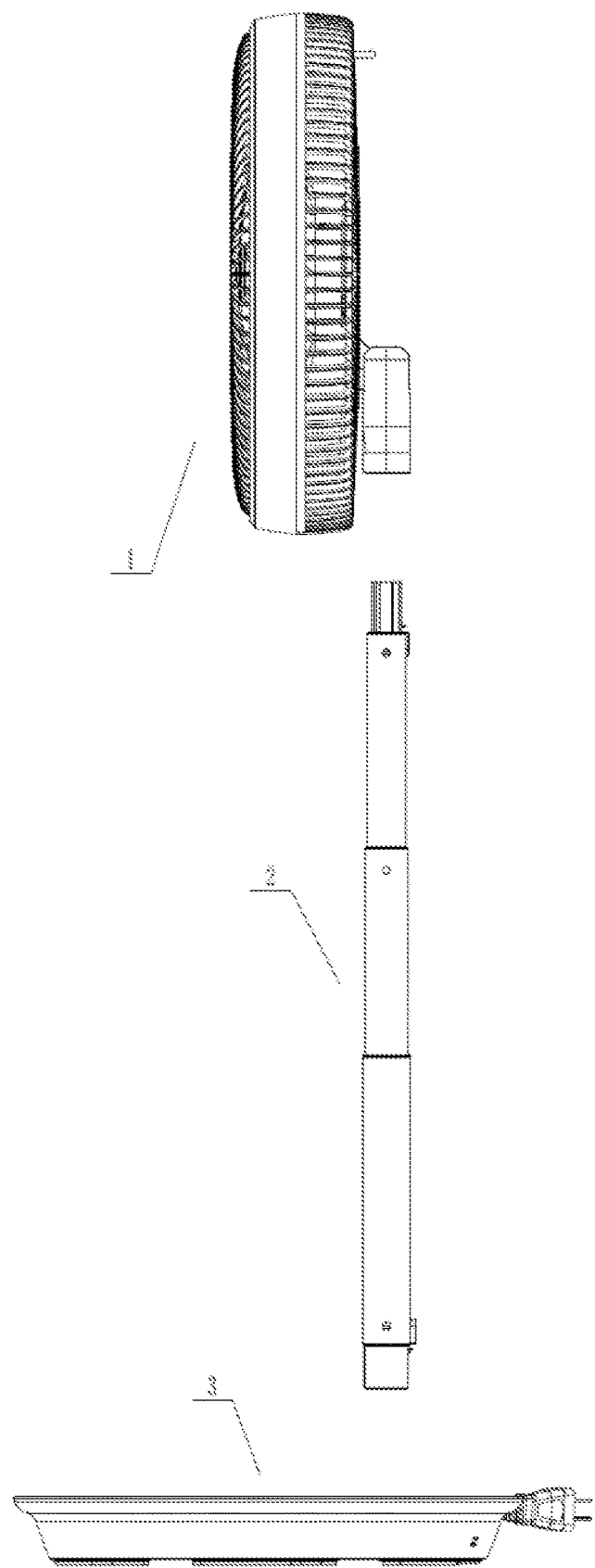
FIG. 2 is a structural exploded view of a storable fan according to an embodiment of the present disclosure.

As shown in FIG. 1 and FIG. 2, an embodiment of the present disclosure provides a storable fan, including fan head 1, support rod 2, and base 3. The fan head 1, the support rod 2, and the base 3 are connected detachably. First accommodating groove 301 and second accommodating groove 302 are formed in the base 3. The storable fan has a used state and a stored state. The used state refers to a state in which various components of the fan are assembled for blowing or are ready for blowing. In response to the used state of the storable fan, the fan head 1, the support rod 2, and the base 3 are connected sequentially. The stored state refers to a state in which various components of the fan are arranged for storage. In response to the stored state of the storable fan, the fan head 1 is stored in the first accommodating groove 301. The support rod 2 is stored in the second accommodating groove 302.

According to the storable fan provided by the above embodiment, the fan head 1, the support rod 2 and the base 3 are connected detachably, for ease of detachment of the storable fan. Both the fan head 1 and the support rod 2 can be stored in the base 3. The storage process can be accomplished without detaching such fasteners as screws and nuts. The storable fan is stored simply and conveniently, with a small footprint.

Figure 5:
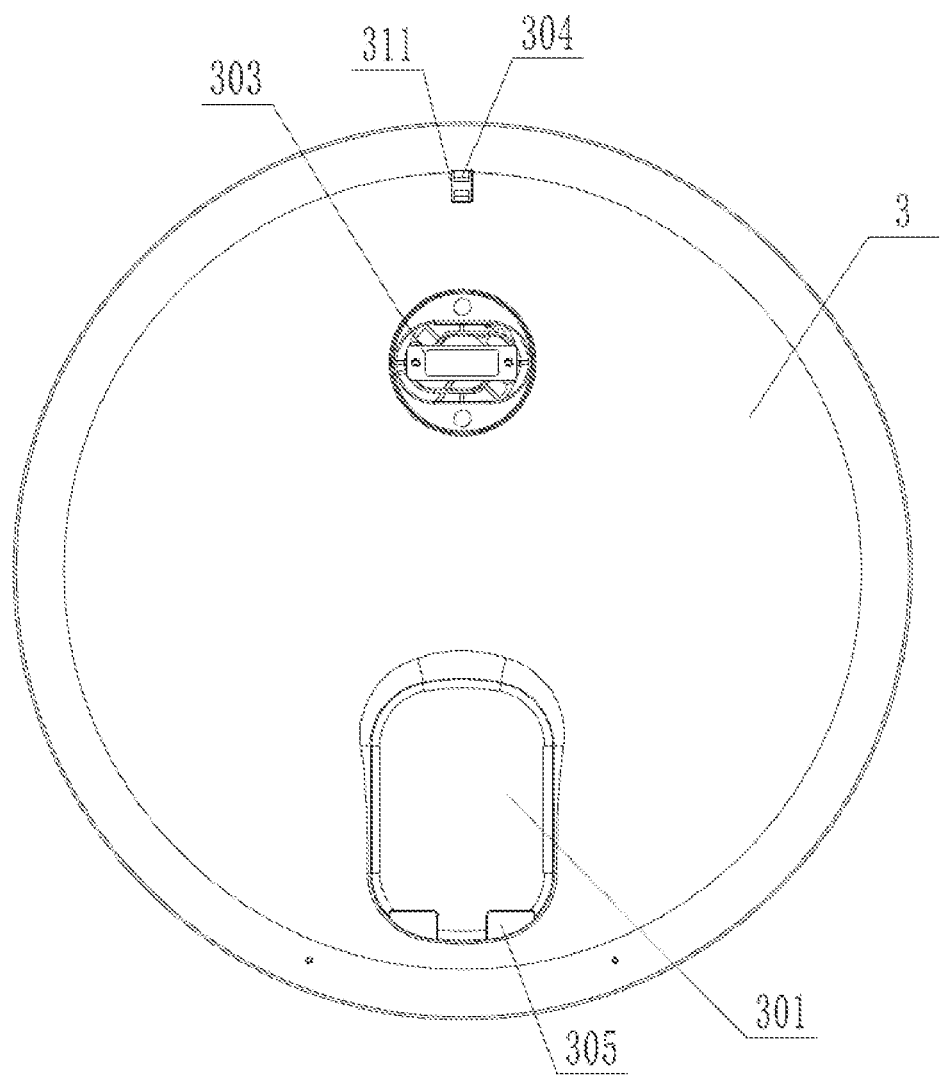
FIG. 5 is a structural reference view of a top of a base in a storable fan according to an embodiment of the present disclosure.
Figure 6:
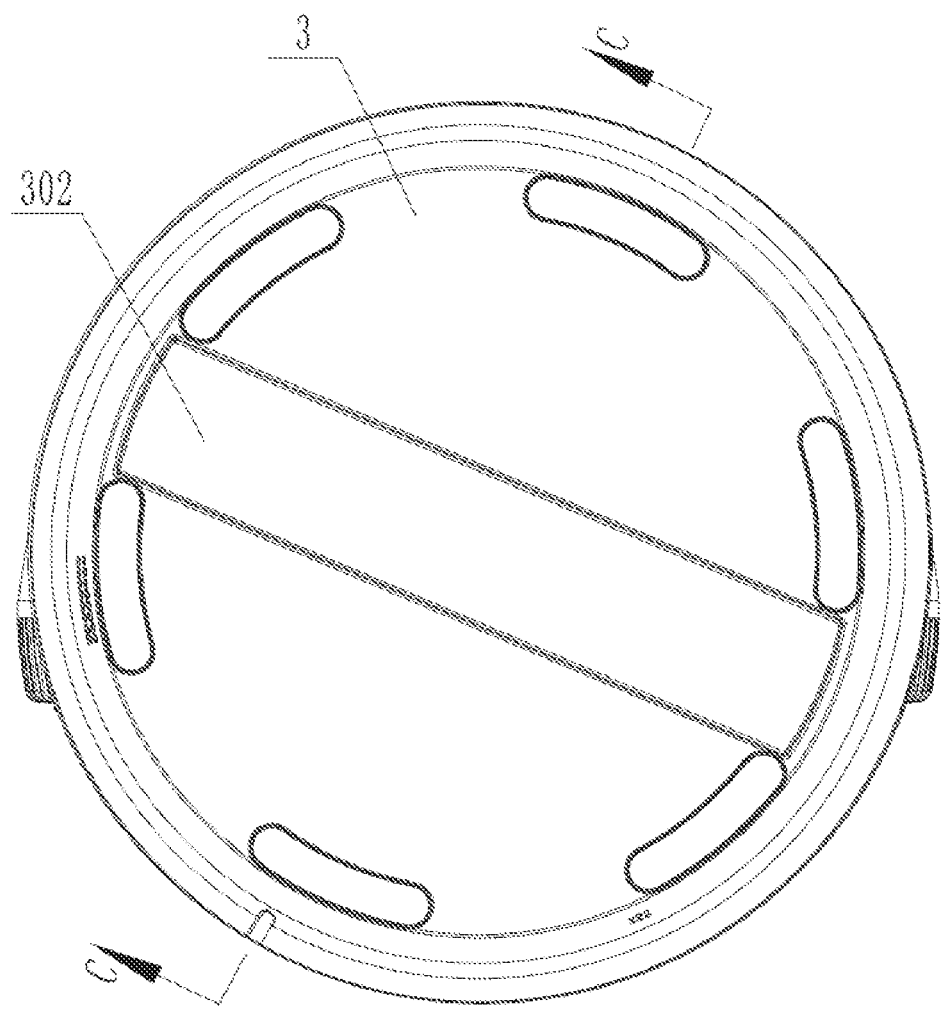
FIG. 6 is a structural reference view of a bottom of a base in a storable fan according to an embodiment of the present disclosure.
Figure 7:
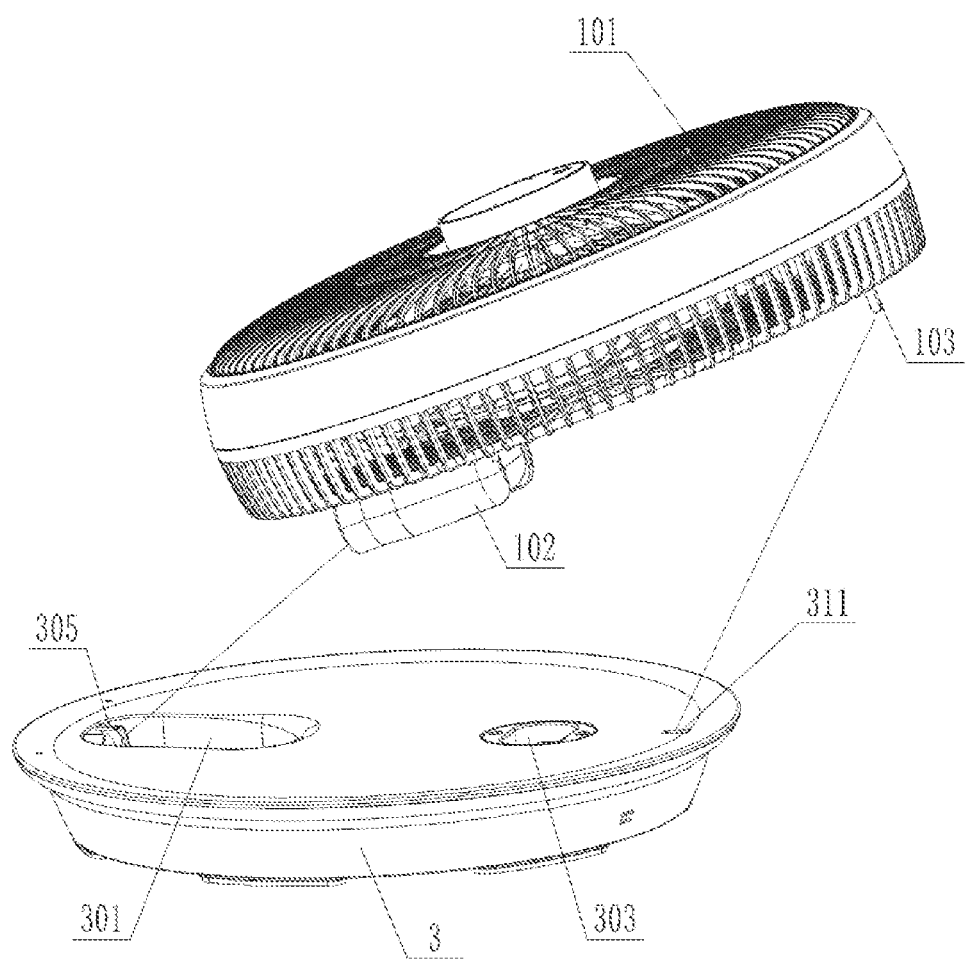
FIG. 7 is a reference view of a storage process for a fan head and a base in a storable fan according to an embodiment of the present disclosure.
Figure 8:
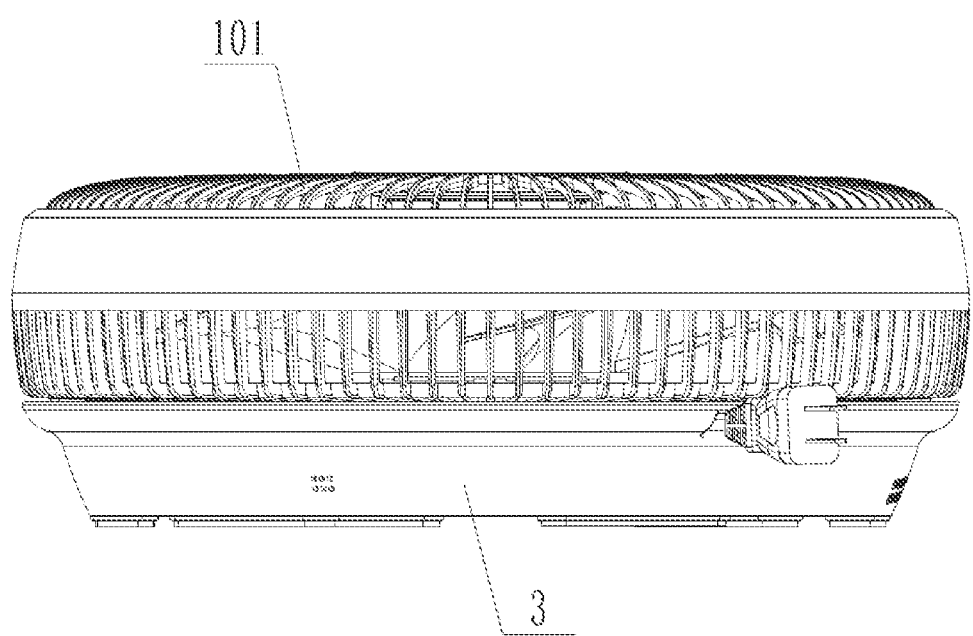
FIG. 8 is a structural reference view of a stored state for a fan head and a base in a storable fan according to an embodiment of the present disclosure.

Preferably, the first accommodating groove 301 is formed in one side of the base 3. The second accommodating groove 302 is formed in the other opposite side of the base 3. For example, as shown in FIGS. 5-7, the first accommodating groove 301 is formed in a top of the base 3. The second accommodating groove 302 is formed in a bottom of the base 3. The fan head 1 and the support rod 2 can be respectively stored at two sides of the base 3. This makes full use of a space of the base 3, and prevents mutual interference between the fan head 1 and the support rod 2.

According to the storable fan provided by the embodiment of the present disclosure, specifically, detachable connection between the fan head 1, the support rod 2, and the base 3 is preferably realized by insertion. The operation is simple, convenient, and easy-to-realize. Specifically, as shown in FIGS. 11-17, two ends of the support rod 2 are respectively provided with first insertion portion 218 and second insertion portion 219. The fan head 1 includes guard 101 and connecting segment 102 rotatably connected to the guard 101. Fixing hole 303 is formed in the base 3. In response to the used state of the storable fan, the two ends of the support rod 2 are respectively connected to the connecting segment 102 and the fixing hole 303. The first insertion portion 218 of the support rod 2 is inserted with a connecting portion, while the second insertion portion 219 of the support rod 2 is inserted with the fixing hole 303. In response to the stored state of the storable fan, the connecting segment 102 is fixed in the first accommodating groove 301. A shape of the first accommodating groove 301 is matched with a contour of a connecting end.

In order to realize stable connection and convenient detachment for the two ends of the support rod 2 with the fan head 1 and the base 3, the two ends of the support rod 2 may be respectively provided with a corresponding structural component.

Figure 15:
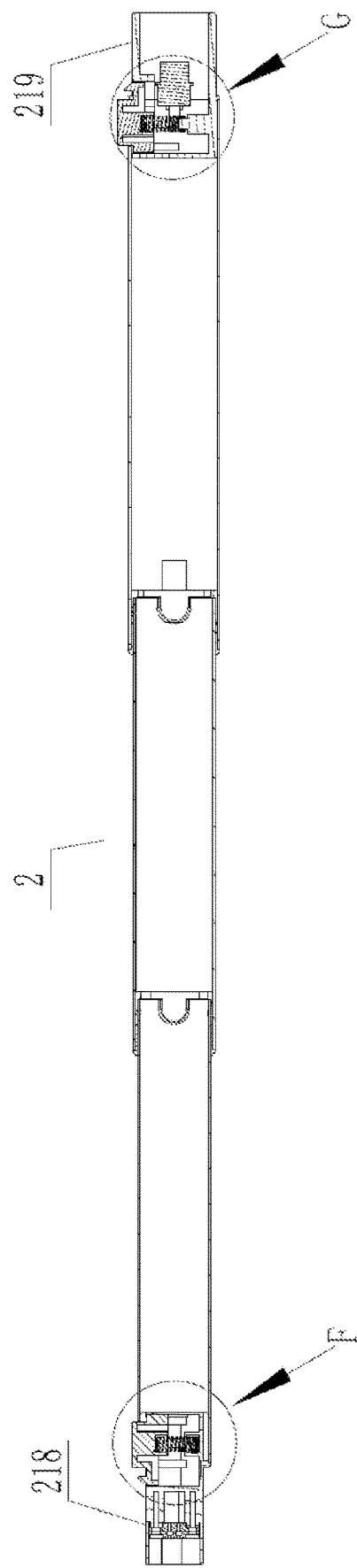
FIG. 15 is a sectional view along B-B in FIG. 14.
Figure 16:
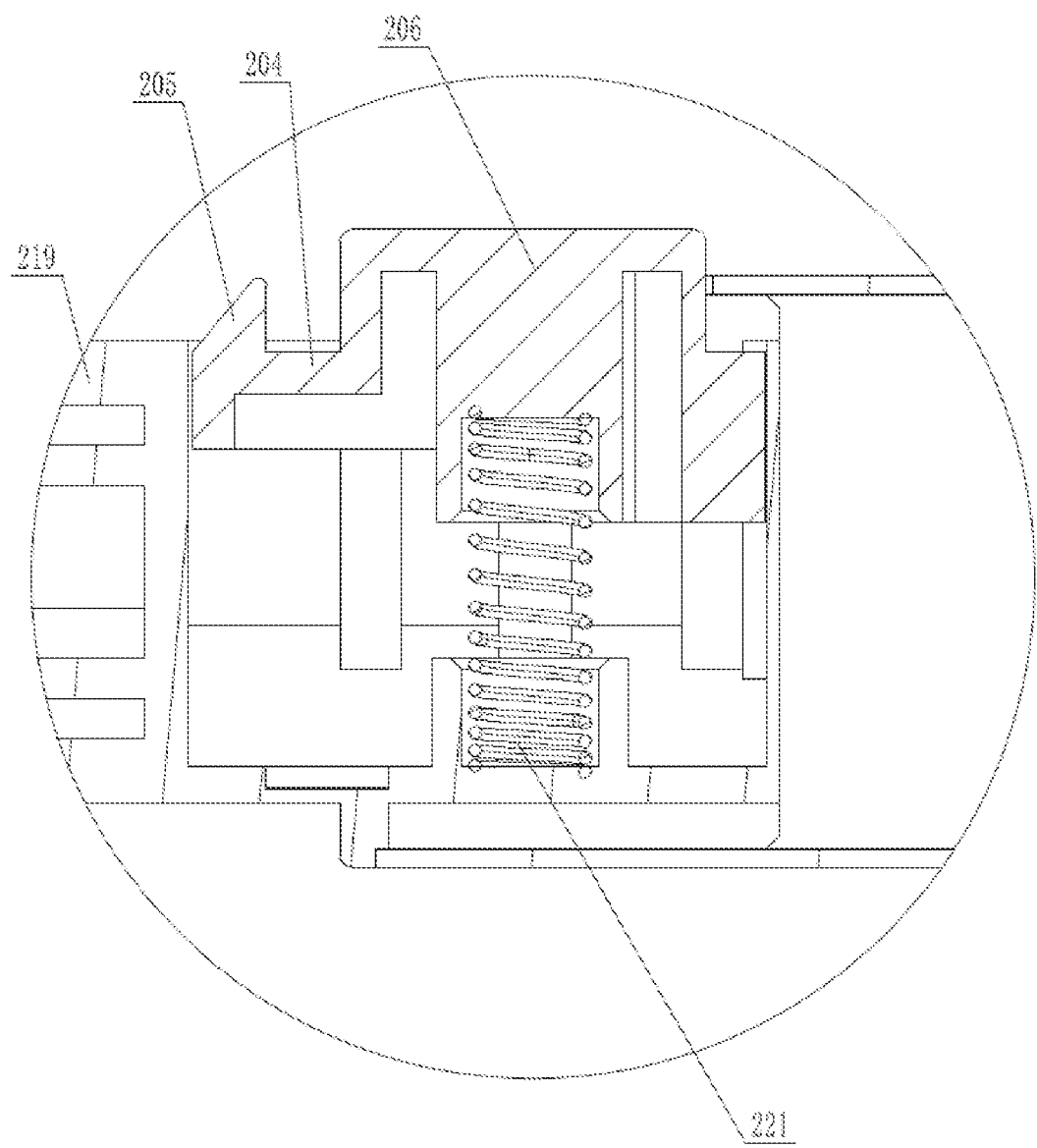
FIG. 16 is a partially enlarged view of F in FIG. 15.

Optionally, as shown in FIG. 15 and FIG. 16, a first end of the support rod 2 connected to the fan head 1, namely the first insertion portion 218, is provided thereon with first pressing plate 201. First engagement member 202 and first button 203 are provided on the first pressing plate 201. A first engagement portion cooperated with the first engagement member 202 is provided on the fan head 1. By pressing the first button 203, the first pressing plate 201 can drive the first engagement portion to move inward, thereby generating an acting force opposite to a movement direction. After the first button 203 is loosened, the first pressing plate 201 and the first button 203 are restored under the acting force. Herein, the acting force may be generated by fourth elastic piece 220 between the first pressing plate 201 and the support rod 2. Alternatively, the first pressing plate 201 may further be provided as a cantilever structure integrally connected to the support rod 2; and the acting force is generated by deformation of the first pressing plate 201. When the storable fan is used, the first button 203 at the end of the support rod 2 is pressed, such that the first pressing plate 201 and the first engagement member 202 move inward. The first insertion portion 218 at the end of the support rod 2 is inserted into the connecting segment 102 of the fan head 1. After the first button 203 is loosened, the first pressing plate 201 and the first engagement member 202 are restored reversely. The first engagement member 202 is engaged with the first engagement portion on the connecting segment 102 of the fan head 1 to realize installation and fixation for the fan head 1 and the support rod 2. When the fan head 1 and the support rod 2 are to be detached, the first button 203 at the end of the support rod 2 is pressed, such that the first pressing plate 201 and the first engagement member 202 move inward, and the first engagement member 202 is separated from the first engagement portion. The first insertion portion 218 at the end of the support rod 2 is moved out of the connecting segment 102 of the fan head 1. After the first button 203 is loosened, the first pressing plate 201 and the first engagement member 202 are restored reversely to realize detachment for the fan head 1 and the support rod 2.

Figure 17:
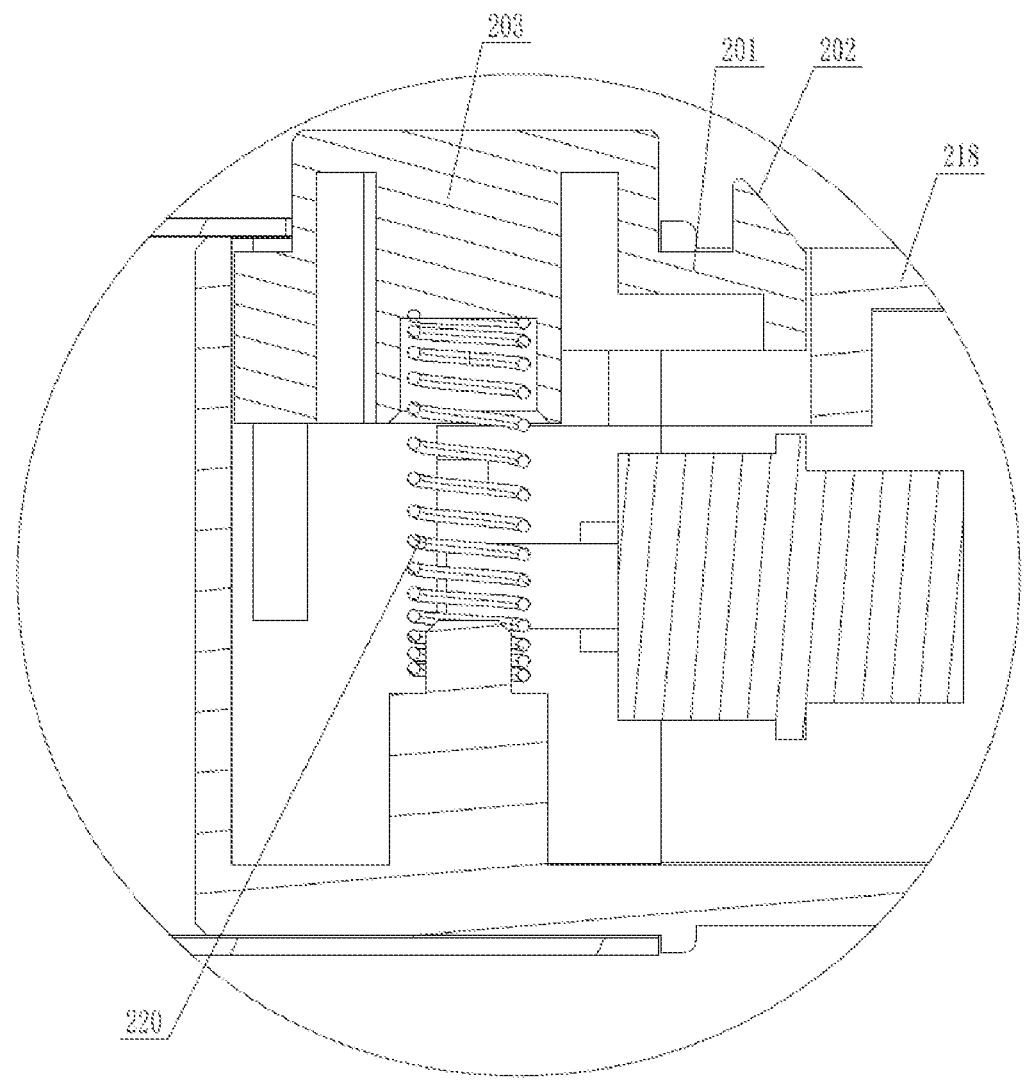
FIG. 17 is a partially enlarged view of G in FIG. 15.

Likewise, as shown in FIG. 15 and FIG. 17, a second end of the support rod 2 connected to the base 3, namely the second insertion portion 219, is provided thereon with second pressing plate 204. Second engagement member 205 and second button 206 are provided on the second pressing plate 204. A second engagement portion cooperated with the second engagement member 205 is provided in the fixing hole 303 of the base 3. By pressing the second button 206, the second pressing plate 204 can drive the second engagement portion to move inward, thereby generating an acting force opposite to a movement direction. After the second button 206 is loosened, the second pressing plate 204 and the second button 206 are restored under the acting force. Herein, the acting force may be generated by fifth elastic piece 221 between the second pressing plate 204 and the support rod 2. Alternatively, the second pressing plate 204 may further be provided as a cantilever structure integrally connected to the support rod 2; and the acting force is generated by deformation of the second pressing plate 204. When the storable fan is used, the second button 206 at the end of the support rod 2 is pressed, such that the second pressing plate 204 and the second engagement member 205 move inward. The second insertion portion 219 at the end of the support rod 2 is inserted into the fixing hole 303 of the base 3. After the second button 206 is loosened, the second pressing plate 204 and the second engagement member 205 are restored reversely. The second engagement member 205 is engaged with the second engagement portion in the fixing hole 303 of the base 3 to realize installation and fixation for the base 3 and the support rod 2. When the base 3 and the support rod 2 are to be detached, the second button 206 at the end of the support rod 2 is pressed, such that the second pressing plate 204 and the second engagement member 205 move inward, and the second engagement member 205 is separated from the second engagement portion. The second insertion portion 219 at the end of the support rod 2 is moved out of the fixing hole 303 of the base 3. After the first button 206 is loosened, the first pressing plate 204 and the first engagement member 205 are restored reversely to realize detachment for the base 3 and the support rod 2.

On the basis of the above implementations, for the sake of more convenient and quicker installation, as shown in FIG. 16 and FIG. 17, an end of the first engagement member 202 away from the second end (the second insertion portion 219) of the support rod 2 is provided with an outward wedge-shaped surface. With the wedge-shaped surface, when the first insertion portion 218 of the support rod 2 is inserted into the connecting segment 102 of the fan head 1, the first button 203 is unnecessarily pressed. During insertion, the connecting segment 102 is interfered with the wedge-shaped surface of the first engagement member 202, and the first engagement member 202 and the first pressing plate 201 are moved inward forcibly. After the insertion is in place, the wedge-shaped surface of the first engagement member 202 is released from the connecting segment 102, and the first engagement member moves reversely to engage with the first engagement portion. Likewise, an end of the second engagement member 205 away from the first end (the first insertion portion 218) of the support rod 2 is provided with an outward wedge-shaped surface. With the wedge-shaped surface, when the second insertion portion 219 of the support rod 2 is inserted into the fixing hole 303 of the base 3, the second button 206 is unnecessarily pressed. During insertion, an inner wall of the fixing hole 303 is interfered with the wedge-shaped surface of the second engagement member 205, and the second engagement member 205 and the second pressing plate 204 are moved inward forcibly. After the insertion is in place, the wedge-shaped surface of the second engagement member 205 is released from the inner wall of the fixing hole 303, and the second engagement member 205 moves reversely to engage with the second engagement portion. With the wedge-shaped surfaces on the first engagement member 202 and the second engagement member 205, when the fan is assembled, various structural components can be fixedly connected without pressing. The structural components can also be detached only by pressing. Therefore, the one-button operation is realized.

Figure 3:
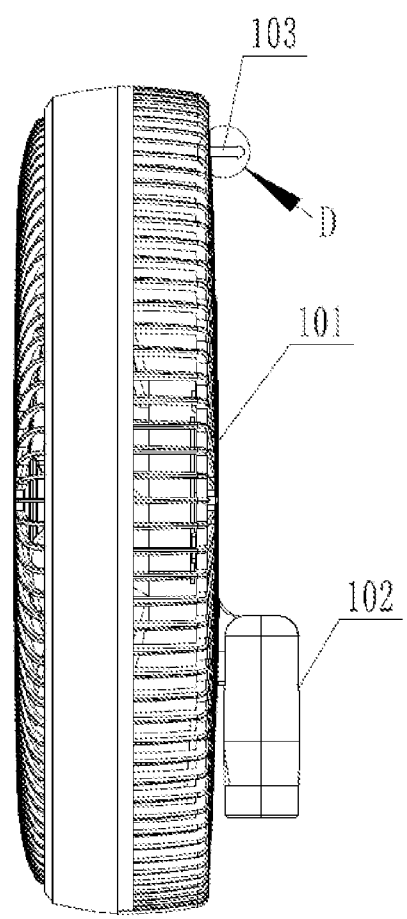
FIG. 3 is a structural reference view of a fan head in a storable fan according to an embodiment of the present disclosure.
Figure 4:
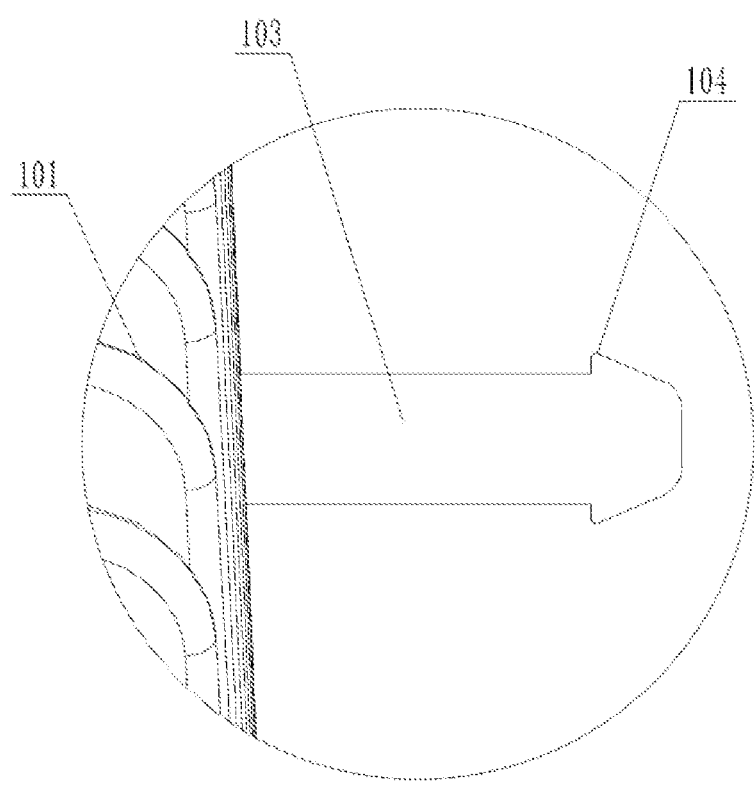
FIG. 4 is a partially enlarged view of D in FIG. 3.
Figure 19:
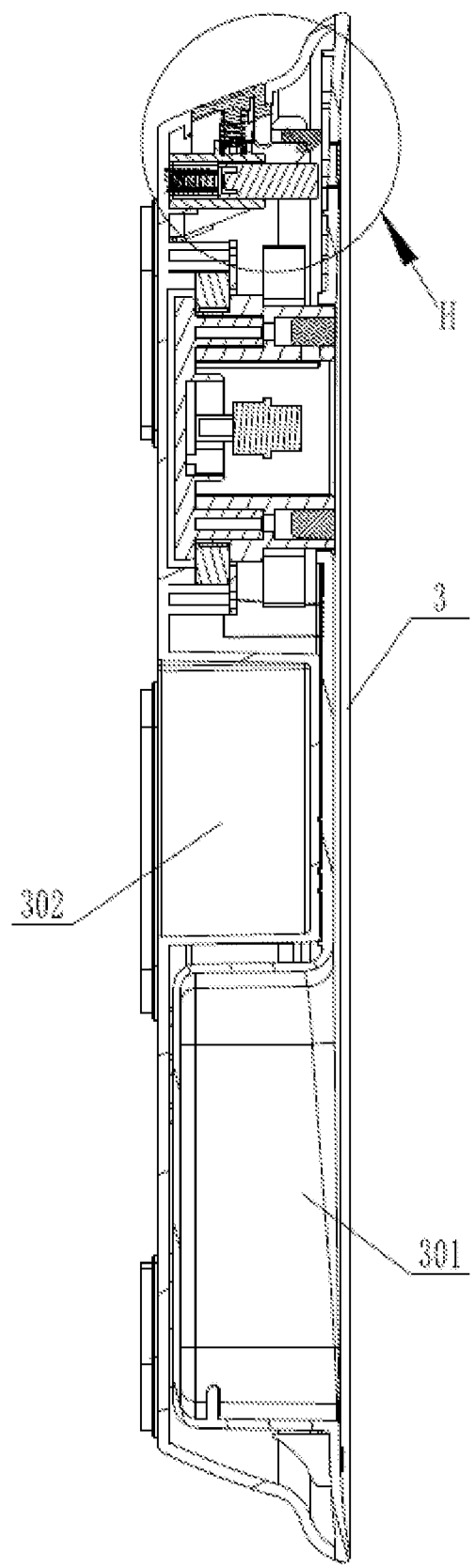
FIG. 19 is a sectional view along C-C in FIG. 6.
Figure 20:
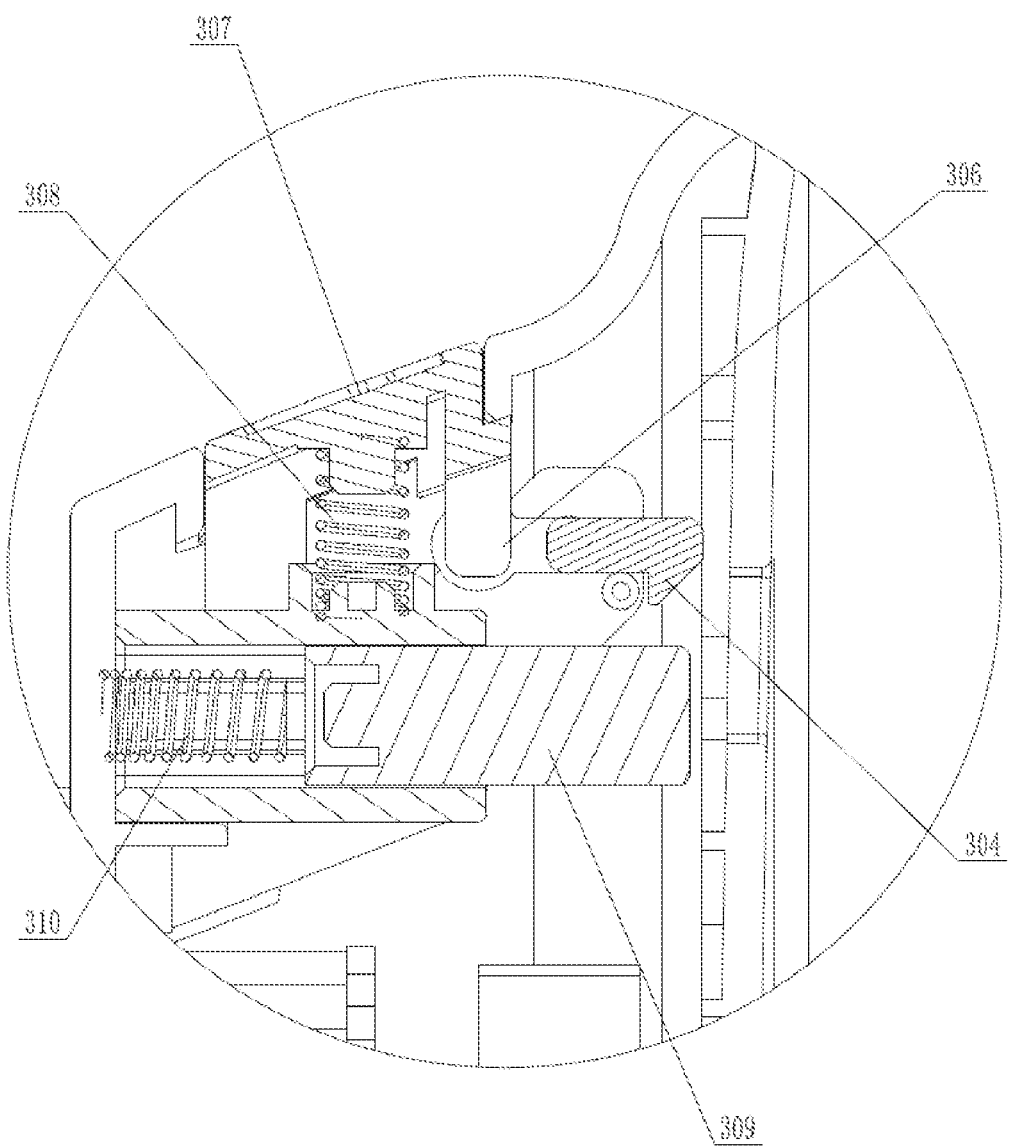
FIG. 20 is a partially enlarged view of G in FIG. 18.

When the fan head 1 is stored in the first accommodating groove 301 of the base 3, the connecting segment 102 of the fan head 1 is attached to the guard 101 by rotating. The connecting segment 102 is then placed into the first accommodating groove 301, thereby realizing storage of the fan head 1. In this case, the guard 101 may rotate relative to the connecting segment 102 to make an overall structure of the fan head 1 and the base 3 unstable. In view of this, as shown in FIG. 3, FIG. 4 and FIG. 7, a first locking piece is provided on the fan head 1. A second locking piece is provided on the base 3. In the stored state shown in FIG. 8, the first locking piece is locked with the second locking piece. Specifically, the first locking piece is provided on the guard 101. Through cooperation between the first locking piece and the second locking piece, the fan head 1 and the base 3 can further be limited. This prevents the guard 101 from moving relative to the base 3 to make the storage structure unstable. Preferably, as shown in FIG. 4 and FIG. 5, the first locking piece is locking rod 103. Stationary blocking portion 104 is provided on a surface of the locking rod 103 along the radial direction of the locking rod 103. The second locking piece is locking hole 311 formed in the base 3. Movable blocking portion 304 is provided on an inner wall of the locking hole 311. The movable blocking portion 304 is extended into the locking hole 311 under an elastic force. When the locking rod 103 is inserted into the locking hole 311, the stationary blocking portion 104 pushes away the movable blocking portion 304 and is inserted under the movable blocking portion. The blocking portion is restored under the elastic force to realize engagement between the movable blocking portion 304 and the stationary blocking portion 104, as well as locking between the locking rod 103 and the locking hole 311. When the locking rod 103 is to be moved out of the locking hole 311, the locking rod 103 is moved outward by an external force. With the external force, the stationary blocking portion 104 pushes the movable blocking portion 304 forcibly to realize separation between the locking rod 103 and the locking hole 311. More preferably, as shown in FIG. 19 and FIG. 20, the movable blocking portion 304 is connected to fourth button 307 through connecting rod 306 rotatably connected to the base 3. The fourth button 307 is provided at a side of the base 3. First elastic piece 308 is provided between the fourth button 307 and the button 3. By pressing the fourth button 307 to overcome an elastic restoring force of the first elastic piece 308, the connecting rod 306 rotates, thereby driving the movable blocking portion 304 to move toward a direction away from a center of the locking hole 311. Therefore, the limitation between the movable blocking portion 304 and the stationary blocking portion 104 can be released. After the fourth button 307 is loosened, the fourth button 307 is restored under an action of the first elastic piece 308. In addition, propping member 309 is provided at a bottom of the locking hole 311. The propping member 309 is connected to the base 3 through second elastic piece 310. The locking rod 103 abuts against the propping member 309 when entering the locking hole 311 in assembly, so as to overcome an elastic restoring force of the second elastic piece 310. After the fourth button 307 is pressed for unlocking, the second elastic piece 310 can pop up the fan head 1 automatically through the elastic restoring force. Therefore, the operation is more convenient.

In some implementations, as shown in FIG. 5 and FIG. 7, third locking piece 305 is provided in the first accommodating groove 301. The connecting segment 102 is locked with the third locking piece 305 in the stored state, such that a connection strength between the base 3 and the connecting segment 102 can be increased. The third locking piece 305 is preferably an elastic gripping jaw structure. An inner wall of the elastic gripping jaw structure is matched with an external contour of the connecting segment 102. The elastic gripping jaw structure may be provided at one end of the first accommodating groove 301. During storage, one end of the connecting segment 102 can be inserted into the elastic gripping jaw structure. The first locking piece is then connected to the second locking piece.

Figure 9:
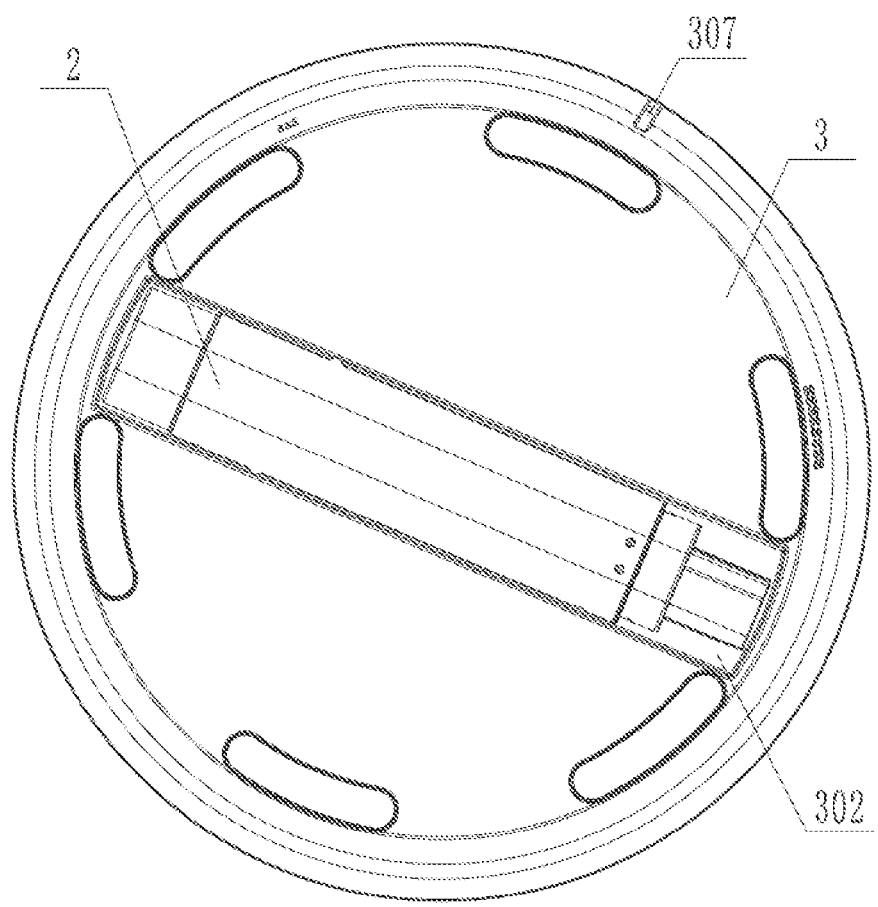
FIG. 9 is a structural reference view of a stored state for a support rod and a base in a storable fan according to an embodiment of the present disclosure.
Figure 10:
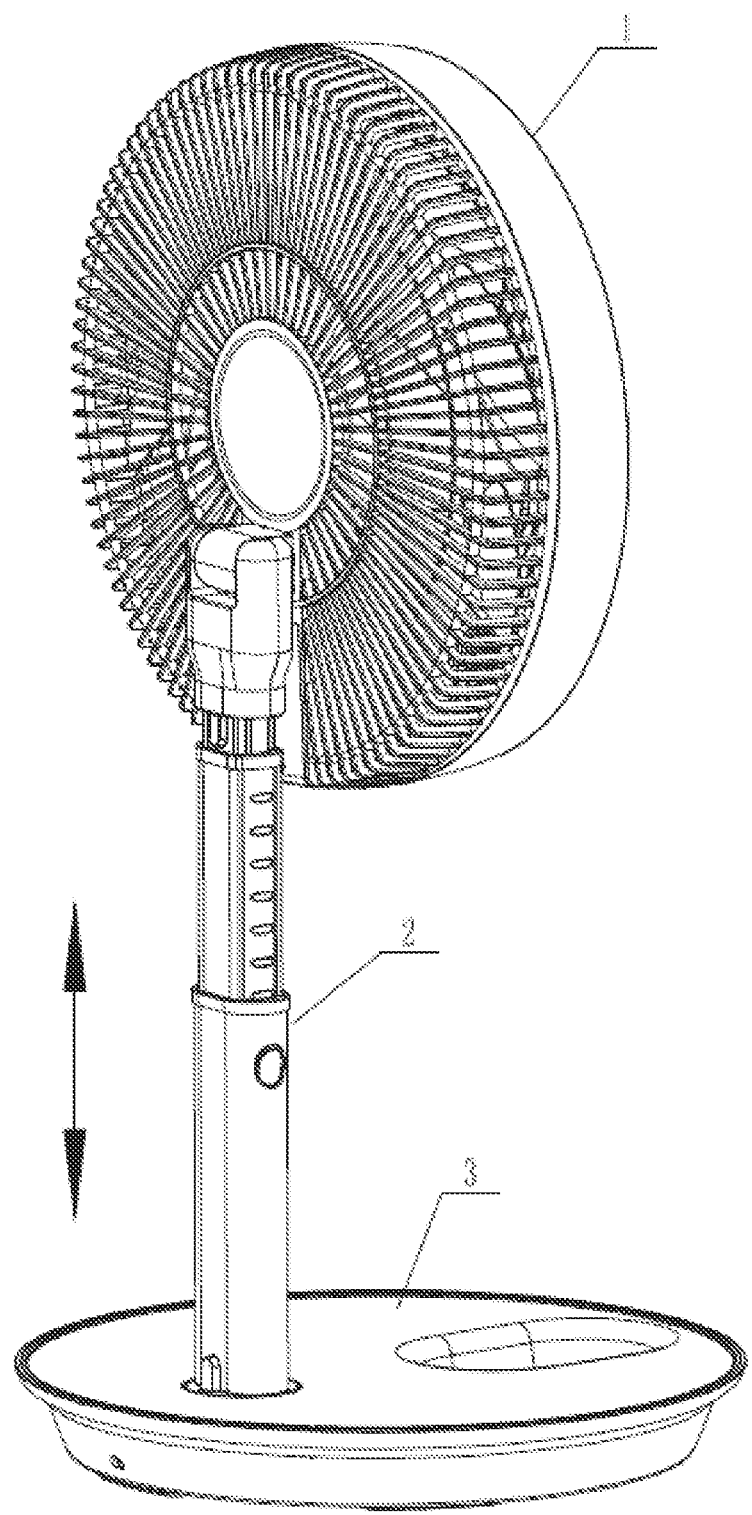
FIG. 10 is a structural reference view of a storable fan in a used state according to an embodiment of the present disclosure.
Figure 11:
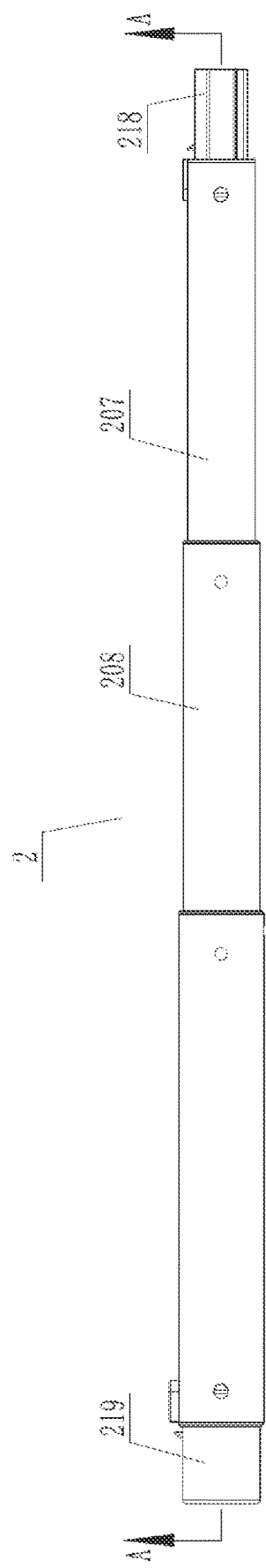
FIG. 11 is a side view of an extended state of a support rod in a storable fan according to an embodiment of the present disclosure.
Figure 12:
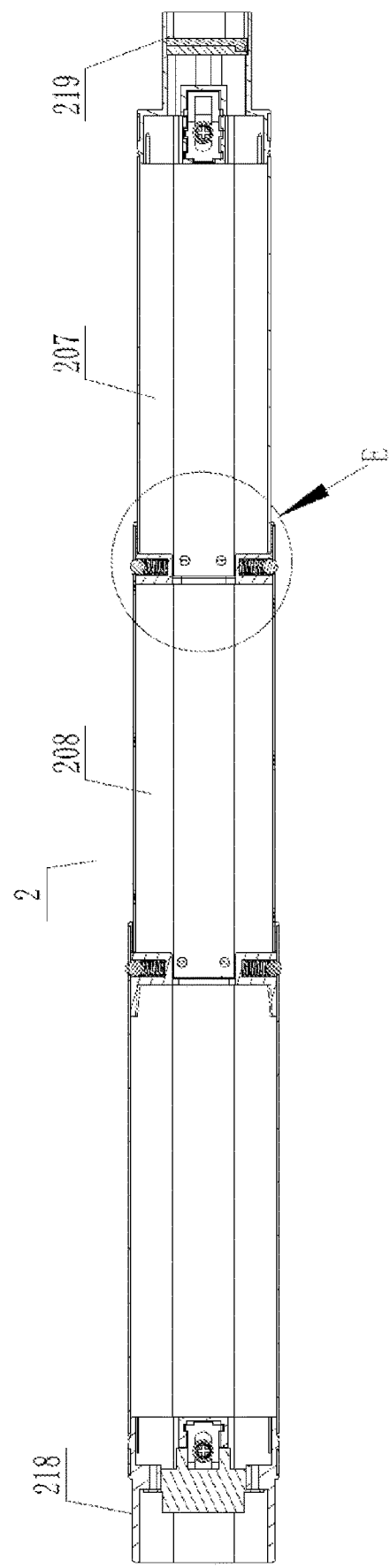
FIG. 12 is a sectional view along A-A in FIG. 11.
Figure 13:
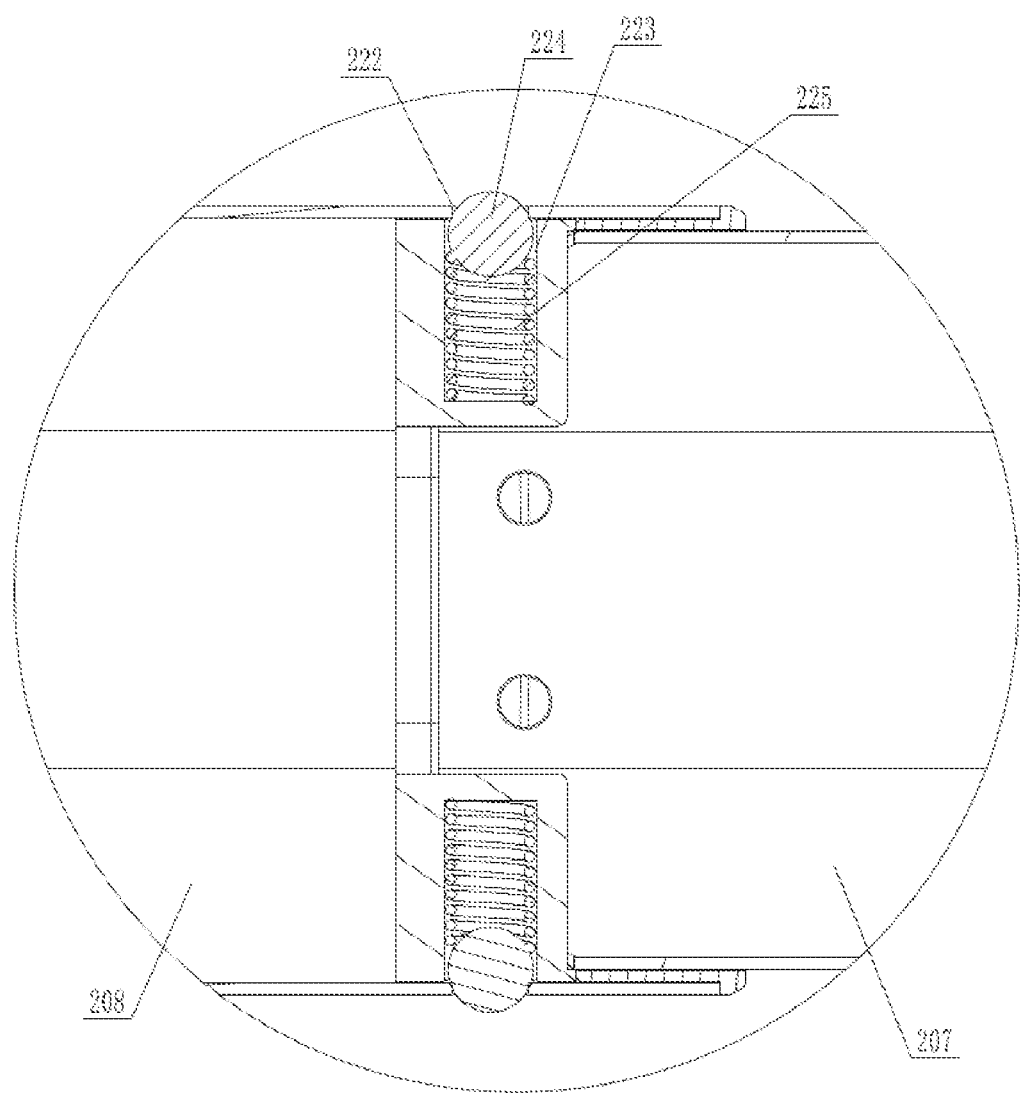
FIG. 13 is a partially enlarged view of E in FIG. 12.
Figure 14:
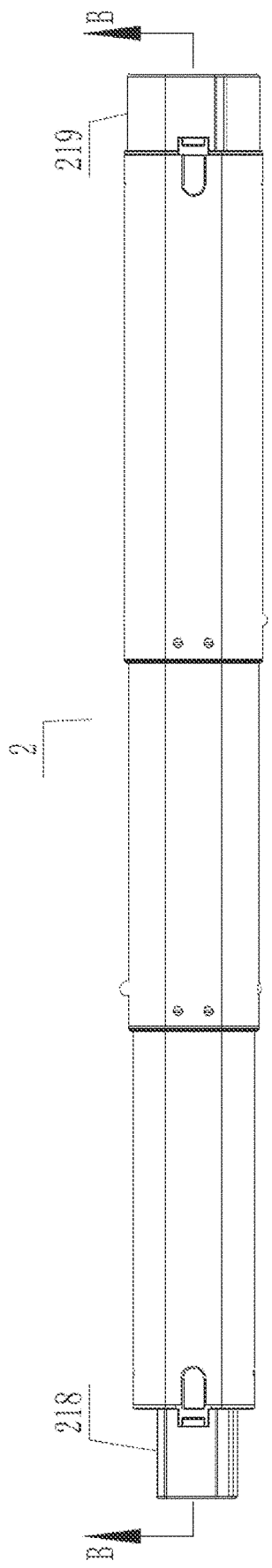
FIG. 14 is a front view of an extended state of a support rod in a storable fan according to an embodiment of the present disclosure.
Figure 18:
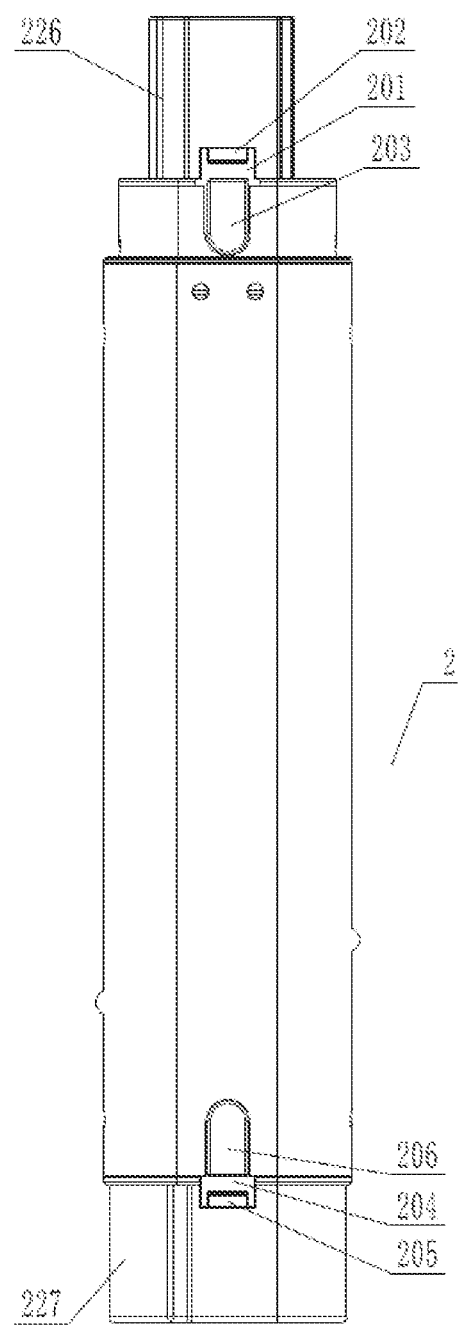
FIG. 18 is a front view of a retracted state of a support rod in a storable fan according to an embodiment of the present disclosure.

In some implementations, the support rod 2 is a telescopic rod shown in FIGS. 11-18. On one hand, in response to the used state, as shown in FIG. 10, the height of the electric fan can be adjusted through the telescopic rod, such that the fan head 1 works at different heights to meet actual requirements of a user. On the other hand, in response to the stored state, the support rod 2 is retracted as shown in FIG. 18, for better storage of the support rod 2. As shown in FIG. 9, the second accommodating groove 302 in the base 3 is matched with the contour of the support rod 2 in the retracted state.

On the basis of the above implementations, the specific structure of the support rod 2 may be various forms of the telescopic rod in the prior art, provided that the objective of the present disclosure can be realized.

Figure 21:
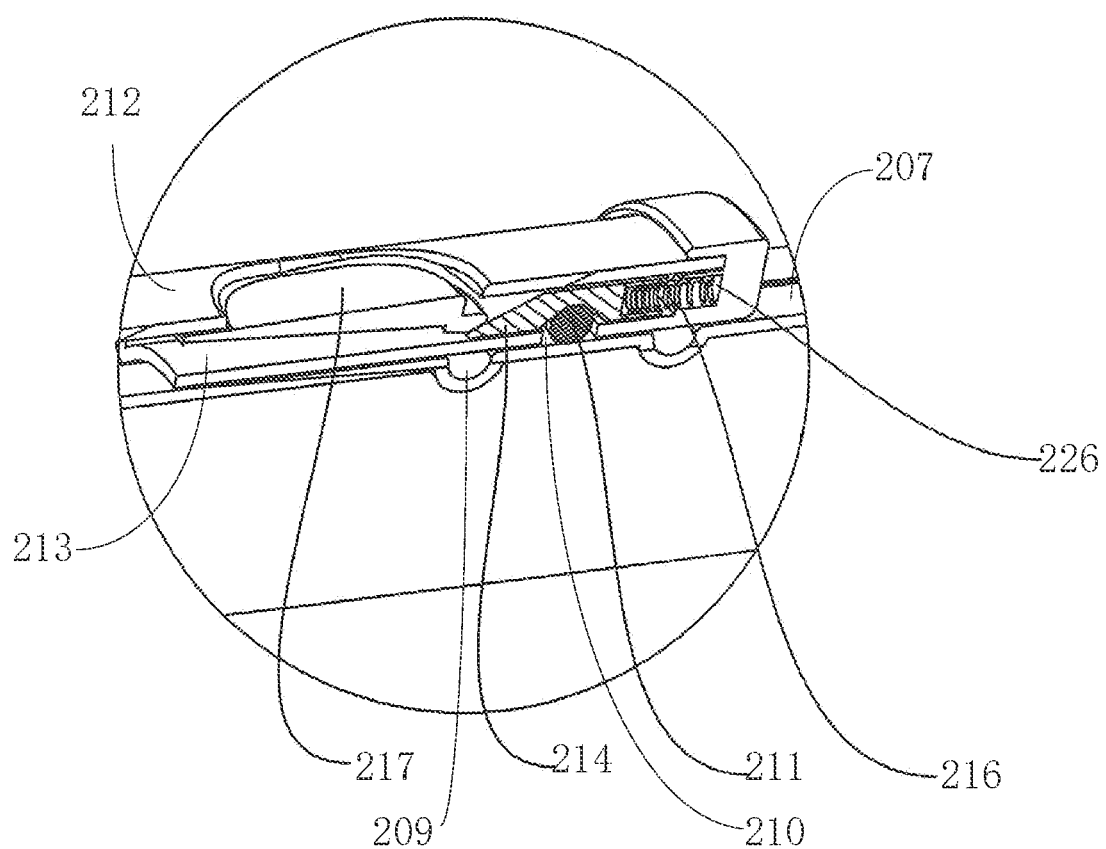
FIG. 21 is a structural reference view of a specific implementation for a locating structure of a telescopic rod in an unlocked state according to an embodiment of the present disclosure.
Figure 22:
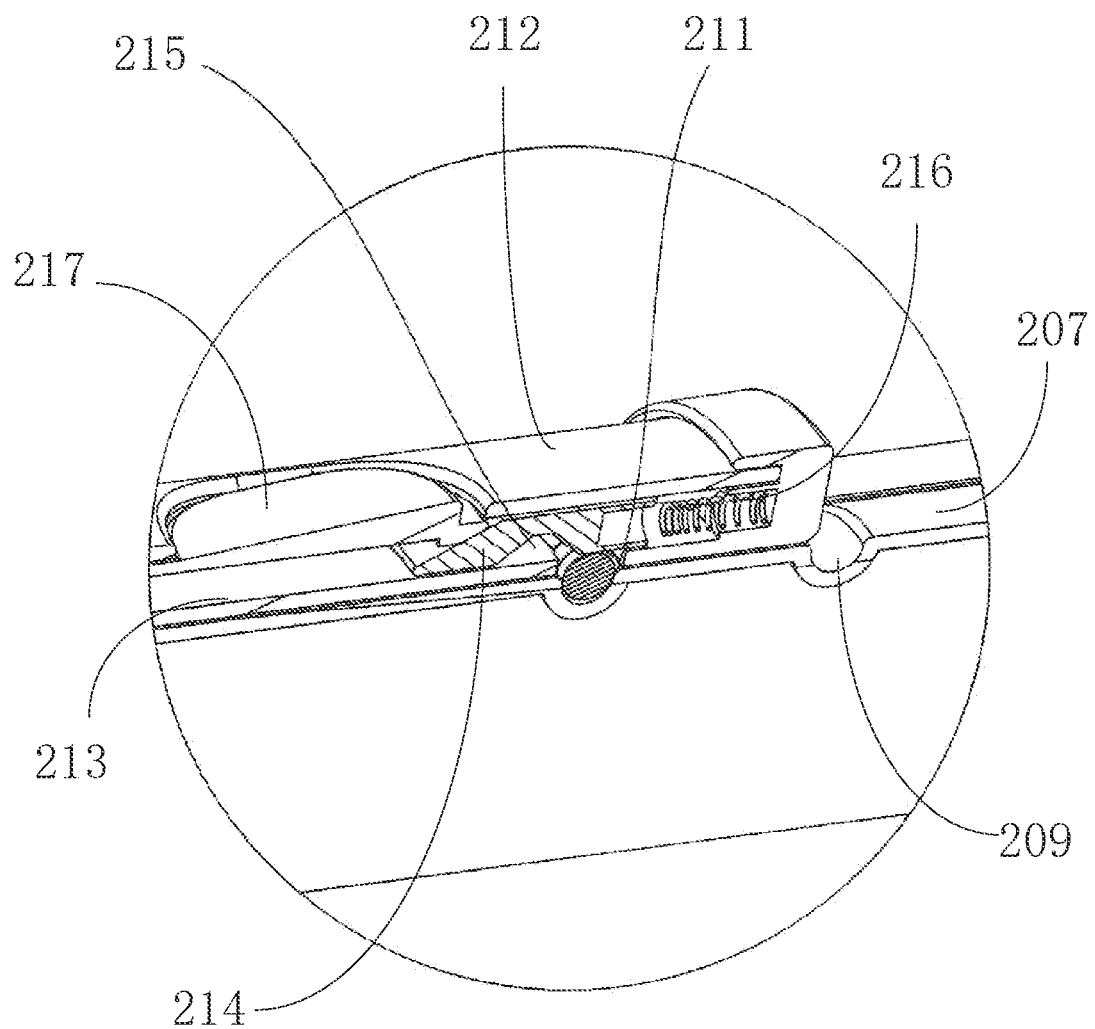
FIG. 22 is a structural reference view of a specific implementation for a locating structure of a telescopic rod in a locked state according to an embodiment of the present disclosure.

Optionally, as shown in FIG. 21 and FIG. 22, the support rod 2 includes first rod 207 and second rod 208 connected to each other. The first rod 207 is nested in the second rod 208. A plurality of first grooves 209 are formed in an outer wall of the first rod 207 along the axial direction of the first rod 207. A control assembly, limiting hole 210 and locating pin 211 are provided on the second rod 208. The locating pin 211 is located in the limiting hole 210. The control assembly is configured to limit the locating pin 211 in a locked state of being simultaneously engaged in the first groove 209 and the limiting hole 210. The control assembly is further configured to release the locked state of the locating pin 211. Specifically, the second rod 208 includes first wall 212 and second wall 213. The second wall 213 is sleeved with the first rod 207. The control assembly includes slider 214 and third elastic piece 216. The slider 214 is slidably provided between the first wall 212 and the second wall 213. A side of the slider 214 facing the second wall 213 is provided with second groove 215. When the limiting hole 210 directly faces the first groove 209, the slider 214 limits the locating pin 211 in the limiting hole 210 and the first groove 209 simultaneously under an elastic force of the third elastic piece 216. When the storable fan is used, the slider 214 is pushed to overcome an elastic restoring force of the third elastic piece 216 to slide in mounting groove 226 between the first wall 212 and the second wall 213. As shown in FIG. 21, at an extreme position, the second groove 215 in the slider 214 can directly face the limiting hole 210 in the second wall 213. By moving the first rod 207, the outer wall of the first rod 207 pushes the locating pin 211 to move to the second groove 215 of the slider 214. In this case, the first rod 207 and the second rod 208 cannot be locked. When some first groove 209 in the first rod 207 directly faces the limiting hole 210, the locating pin 211 can be located in the limiting hole 210 and the first groove 209 simultaneously. If the slider 214 is not pushed, the slider 214 is restored under the third elastic piece 216, as shown in FIG. 22. In this case, a bottom of the slider 214 abuts against the locating pin 211, the locating pin 211 cannot be released completely from the first groove 209, and the first rod 207 and the second rod 208 are locked through the locating pin 211. When the locking is to be released, the slider 214 is pushed, such that the second groove 215 directly faces the limiting hole 210. Through the first rod 207 moving axially relative to the second rod 208, the locating pin 211 is released from the first groove 209 to enter the second groove 215, as shown in FIG. 21. In order to realize the above action, a sum of a thickness of the slider 214 and a diameter of the locating pin 211 is greater than a distance between an inner wall of the first wall 212 and an inner wall of the second wall 213. When the slider 214 is attached to the first wall 212, a distance between a bottom of the first groove 209 and the inner wall of the second wall 213 is not less than the diameter of the locating pin 211. In order to push the slider 214 more conveniently, third button 217 can be provided on the second rod 208. The third button 217 and the slider 214 are in sliding fit through an oblique plane. By pressing the third button 217, the slider 214 can be pushed to slide. After the third button 217 is loosened, the third elastic piece 216 pushes the slider 214 to move reversely, thereby pushing the third button 217 for restoration. Through the above structure, the length of the telescopic rod is adjusted conveniently, and the telescopic rod in the locked state is stable. Therefore, the operation is more humanized.

Optionally, as shown in the figure, the support rod 2 includes first rod 207 and second rod 208 connected to each other. The first rod 207 is nested in the second rod 208. Locating hole 222 is formed in a wall of the second rod 208. A wall of the first rod 207 is recessed to form an accommodating groove 223. Propping bead 224 and sixth elastic piece 225 are provided in the accommodating groove 223. The sixth elastic piece 225 is provided between the propping bead 224 and a bottom of the accommodating groove 223. Through the sixth elastic piece 225, the propping bead 224 abuts against an inner wall of the second rod 208 or the locating hole 222. A diameter of the locating hole 222 is less than a diameter of the propping bead 224.

The storable fan according to the above embodiment may further includes other necessary assemblies or structures, and the corresponding arrangement positions and connection relationships may refer to structures of related apparatuses in the prior art. The connection relations, operations and working principles of the structures not mentioned above are known to those of ordinary skill in the art, and will not be described in detail herein.

Different embodiments are described progressively herein. Each embodiment focuses on the differences from other embodiments, and mutual reference may be made to the same and similar parts of such examples.

The above are only specific implementations of the present disclosure, such that those skilled in the art can understand or realize the present disclosure. Various modifications to these embodiments are readily apparent to a person skilled in the art, and the generic principles defined herein may be practiced in other embodiments without departing from the spirit or scope of the present disclosure. Thus, the present disclosure is not limited to the embodiments shown herein but falls within the widest scope consistent with the principles and novel features disclosed herein.

What is claimed is:

1. A storable fan, comprising a fan head, a support rod and a base, wherein the fan head, the support rod and the base are connected detachably, wherein a first accommodating groove and a second accommodating groove are formed in the base, and the storable fan has a used state and a stored state; in response to the used state of the storable fan, the fan head, the support rod and the base are connected sequentially; and in response to the stored state of the storable fan, the fan head is stored in the first accommodating groove, and the support rod is stored in the second accommodating groove;

the fan head comprises a guard and a connecting segment rotatably connected to the guard; and a fixing hole is formed in the base; in response to the used state of the storable fan, two ends of the support rod are respectively connected to the connecting segment and the fixing hole; and in response to the stored state of the storable fan, the connecting segment is fixed in the first accommodating groove; and the fixing hole and the first accommodating groove are formed in a same side of the base, and the second accommodating groove is formed in the other opposite side of the base.

2. The storable fan according to claim 1, wherein the support rod is a telescopic rod.

3. The storable fan according to claim 2, wherein the support rod is retracted in the stored state.

4. The storable fan according to claim 1, wherein a first end of the support rod connected to the fan head is provided with a first pressing plate, a first engagement member and a first button are provided on the first pressing plate, and a first engagement portion cooperated with the first engagement member is provided on the fan head; and/or a second end of the support rod connected to the base is provided with a second pressing plate, and a second engagement member and a second button are provided on the second pressing plate, and a second engagement portion cooperated with the second engagement member is provided on the base.

5. The storable fan according to claim 4, wherein an end of the first engagement member facing the first end of the support rod is provided with an outward wedge-shaped surface; and/or an end of the second engagement member facing the second end of the support rod is provided with an outward wedge-shaped surface.

6. The storable fan according to claim 1, wherein a first locking piece is provided on the fan head, a second locking piece is provided on the base, and in the stored state, the first locking piece is locked with the second locking piece.

7. The storable fan according to claim 6, wherein the first locking piece is a locking rod, a stationary blocking portion is provided on a surface of the locking rod along a radial direction of the looking rod, the second locking piece is a locking hole formed in the base, a movable blocking portion is provided on an inner wall of the locking hole, and the movable blocking portion is extended into the locking hole under an elastic force.

8. The storable fan according to claim 1, wherein a third locking piece is provided in the first accommodating groove, and in the stored state, the connecting segment is locked with the third locking piece.

9. The storable fan according to claim 2, wherein the support rod comprises a first rod connected to each other; the first rod is nested in the second rod; a plurality of first grooves are formed in an outer wall of the first rod along an axial direction of the first rod; a control assembly, a limiting hole and a locating pin are provided on the second rod; the locating pin is located in the limiting hole; and the control assembly is configured to limit the locating pin in a locked state of being simultaneously engaged in the first groove and the limiting hole or release the locked state of the locking pin.

10. The storable fan according to claim 9, wherein the second rod comprises a first wall and a second wall; the second wall is sleeved with the first rod; the control assembly comprises a slider and a third elastic piece; the slider is slidably provided between the first wall and the second wall; a side of the slider facing the second wall is provided with a second groove; and when the limiting hole directly faces the first groove, the slider limits the locating pin in the limiting hole and the first groove simultaneously under an elastic force of the third elastic piece.

* * * * *